Jan. 31, 1933.  A. Y. DODGE  1,895,917
BRAKE
Filed Dec. 3, 1928

INVENTOR.
Adiel Y. Dodge
BY H. O. Clayton
ATTORNEY

Patented Jan. 31, 1933

1,895,917

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed December 3, 1928. Serial No. 323,229.

This invention relates to brakes and is illustrated as embodied in an expanding automobile brake of the type in which the friction means anchors at one end when the drum is turning in one direction and at the other end when the drum is turning in the other direction. An object of the invention is to improve the operating and anchoring means of the brake, and to facilitate its adjustment by novel telescoping adjustable means at one end thereof.

Another feature of the invention relates to the provision of a continuous band brake having considerable flexibility at its center obtained by gradually tapering from said center, the width of the base of a channel-sectioned sheet metal stamping. I prefer that the base of the stamping be in juxtaposition with and substantially parallel to the backing plate, the channel thus opening outwardly toward the drum head. The ends of the band may be reinforced by telescoping channel-sectioned stampings of short length to provide a box sectioned structure and one of said ends may be further constructed to vary the circumferential length of the band to compensate for lining wear. This latter feature preferably consists of a yoke member in the form of a channel-shaped stamping embracing the end of the band and constructed to receive a thrust link, the latter threadedly engaging a pin pivoted to the end of the band.

A further feature embodies a novel toggle actuating mechanism, one of the links of which is passed through slots in the band parts and is pivoted to a pin journaled in the end of the adjusting channel stamping.

Other objects and features of the invention, including a novel anchor means and other desirable details of construction, will be apparent from the following description of the illustrative embodiment shown in the accompanying drawing, in which.

Figure 1:
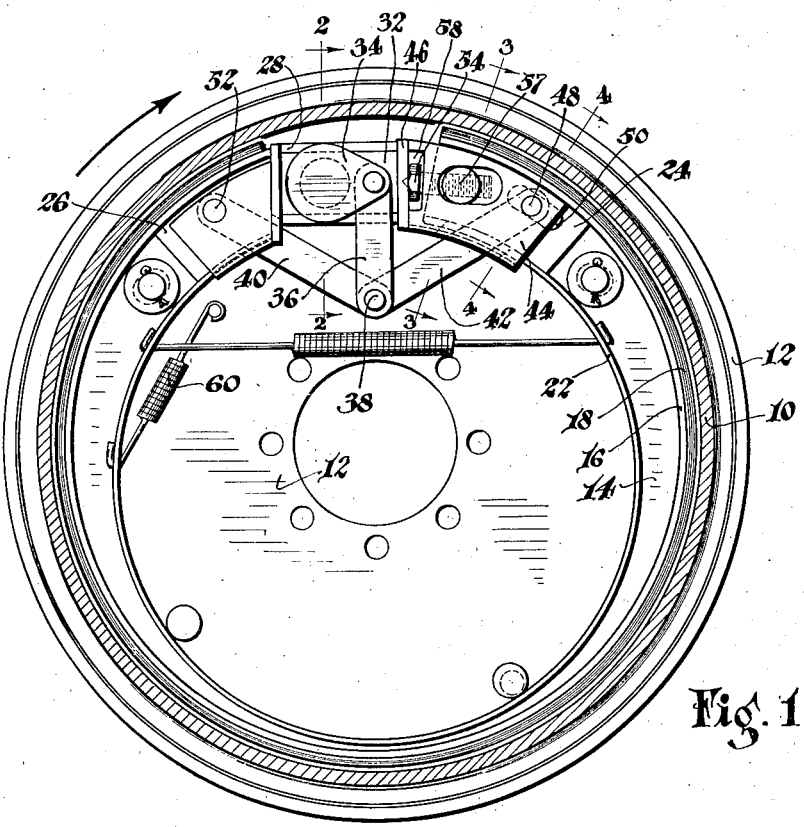
Figure 1 is a view in side elevation of my novel brake structure, the section being taken just inside the head of the brake drum.
Figure 2:
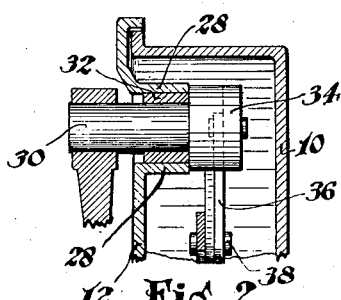
Figure 2 is a section taken on the line 2—2 of Figure 1 through the novel anchor abutment and disclosing the co-operating toggle applying linkage.
Figure 3:
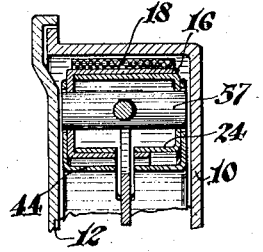
Figure 4:
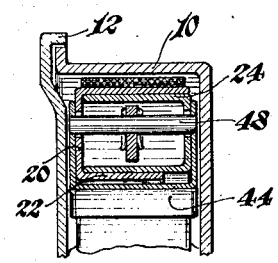
Figure 5:
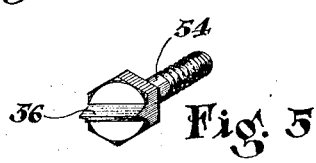

Figures 3 and 4 are sections taken on the lines 3—3 and 4—4 of Figure 1 indicating respectively the novel connection between the end of the band and the adjusting screw member and the connection between the applying linkage and the yoke member; and Figure 5 is a detail view of the adjusting screw.

In the illustrated embodiment of the invention, the brake includes a rotatable drum 10, at the open side of which is a support such as a backing plate 12, and within which is the friction means of the brake, preferably comprising a floating device such as an expansible channel-shaped flexible band 14 provided on its friction face 16, in the form shown, with friction lining 18 riveted or otherwise secured thereto. I prefer further to arrange the base 20 of the channel parallel to the backing plate and to make the lower side 22 of the channel band of lesser width than the side 16. The band is preferably pressed from a single piece of sheet metal and the base 20 is preferably of increasing width from a central part thereof toward both ends, thus providing a flexible central portion permitting the band to be expanded. At the ends of the band I propose to provide reinforcing short length channel-shaped stampings 24 and 26 telescoping within the ends of the band as clearly disclosed in Figures 3 and 4. A rigid box-like construction is thus provided at each end of the friction band.

At one side of the drum there is provided novel anchoring means for the brake, preferably in the form of an abutment comprising parallel laterally extending rectangular portions 28 struck out from the material of the backing plate. This abutment or stop for the floating friction band also functions as a bearing for the applying means, the latter preferably comprising a crank shaft 30 journaled in a rectangular shaped bushing 32 and operating a crank 34 to which is pivoted a link 36, the latter being pivotally connected to the knuckle 38 of toggle links 40 and 42.

According to an important feature of my invention, one end of the friction band is rendered adjustable to vary the effective circumferential length of the band to thus compensate for lining wear. To this end a channel-shaped yoke stamping 44 is telescoped over one end of the band as indicated in Figures 3 and 4, one end thereof being closed by an end plate 46 adapted to abut the anchor 28. A pin 48 may be journaled in the sides of yoke 44 adjacent one end thereof and passes through slots 50 in the sides of the band proper. Toggle link 42 is preferably piveted to pin 48 and passes through slots in the base of the band and yoke to permit the necessary movement of the link in the applying operation. The remaining toggle link 40 is pivotally connected to a pin 52 journaled in the sides of the other end of the friction band.

The adjustment of the yoke 44 may be effected by the screw 54 disclosed in Figure 5, which is preferably provided with a wedge-shaped tit 56 fitting within a correspondingly shaped recess in the end plate 46. Screw 54 is preferably threaded at its end into a transversely extending pin 57 journaled in the sides of the band as disclosed in Figure 3 and adapted to slide in guide slots in the sides of the yoke 44. At the end of the yoke the sides may be slotted at 58 to render the hex end of the screw accessible for adjustment by a wrench.

It will thus be seen that there is provided a simple adjustment through which the friction band anchors when the drum is turning in one direction and through which the applying linkage acts, so constructed and arranged that changes in adjustment do not affect either the anchorage or the application of the brake. By simply turning the screw 54 the yoke 44 is adjusted with respect to the box end of the band, thus increasing its overall length. The thrust of the toggle link 42 is taken by the pin 48 which is transmitted to the yolk to act on the screw to apply the brake.

I further preferably make the return spring 60 sufficiently strong to retain the non-adjustable end of the band anchored during the application of the brake. With forward movement of the car, the right front wheel shown rotates clockwise as indicated by the arrow in Figure 1 and the non-adjustable end of the brake remains anchored during the application thereof, thereby obviating the undesirable anchoring sound that would otherwise ensue.

While but one embodiment of my invention has been shown and described in detail, I do not wish, in the application of my invention, to be restricted thereto or otherwise than by the scope of the appended claims. The novel friction means described above is claimed in my divisional application No. 641,270, filed November 4, 1932.

I claim:

1. A brake comprising, in combination, a rotatable drum, a fixed anchor abutment at one side of the drum, a floating friction device engageable with the drum and having one part which anchors against said abutment when the drum is turning in one direction and a different part which anchors when the drum is turning in the other direction, at least one of said parts being adjustable with respect to the body of the friction device, and means for securing said adjustment including a pin journaled in one end of the friction device and a screw having a threaded engagement with said pin.

2. A brake comprising, in combination, a rotatable drum, a floating friction device within said drum having spaced apart ends, said device comprising a channel-sectioned body portion reinforced at each of its ends by a supplemental channel-shaped member telescoping the body portion, together with a third channel-shaped stamping adjustably connected to one end of said friction device.

3. A brake comprising, in combination, a rotatable drum, a floating band friction device within the drum having spaced apart reinforced end portions, a channel-shaped yoke member telescoping one end of the friction device and adjustable relative thereto by a pin journaled in the end of the friction device, in combination with a screw having one of its ends threadedly engaging said pin and disconnectedly engaging the adjustable yoke member at its other end.

4. A brake comprising a friction element having separable ends, a member adjustably mounted on one of the ends, and a threaded member extending lengthwise of the friction element and engaging the end and the member.

5. A brake comprising a friction element having separable ends, a slotted telescopic member embracing one of the ends, a pin passing through the slot and the end, and an expansible means connecting the pin to the member.

6. A brake comprising a friction element having separable ends, a slotted telescopic member embracing one of the ends, a pin passing through the slot and the friction element, a screw threaded in the pin and having thrust engagement with the member.

7. A brake comprising a friction element having separable ends, a slotted telescopic member embracing one of the ends, a pin passing through the slot and the friction element, a screw threaded in the pin and having thrust engagement with the member and means on the screw for retaining the screw against displacement.

8. A brake comprising a friction element having separable ends, a slotted telescopic member embracing one of the ends, a pin passing through the slot and the friction element, a screw threaded in the pin and the head on the screw having interlocking connection with the member.

9. A brake comprising a friction element having separable ends, a telescopic element embracing one of said ends, a pin passing through one element and a slot in the other, and an expansible means connecting the pin to the slotted element.

10. A brake comprising a friction element having separable ends, a telescopic element embracing one of the ends, a pin secured in one of said elements and passing through a slot in the other, and a screw threaded in the pin and having thrust engagement with the slotted element.

In testimony whereof, I have hereunto signed my name.

ADIEL Y. DODGE.